Feb. 10, 1970     KEIZO SHIMANO ET AL     3,494,227
BICYCLE HUB HAVING A BUILT-IN TWO STAGE SPEED CHANGE MECHANISM
Filed June 6, 1968     4 Sheets-Sheet 1
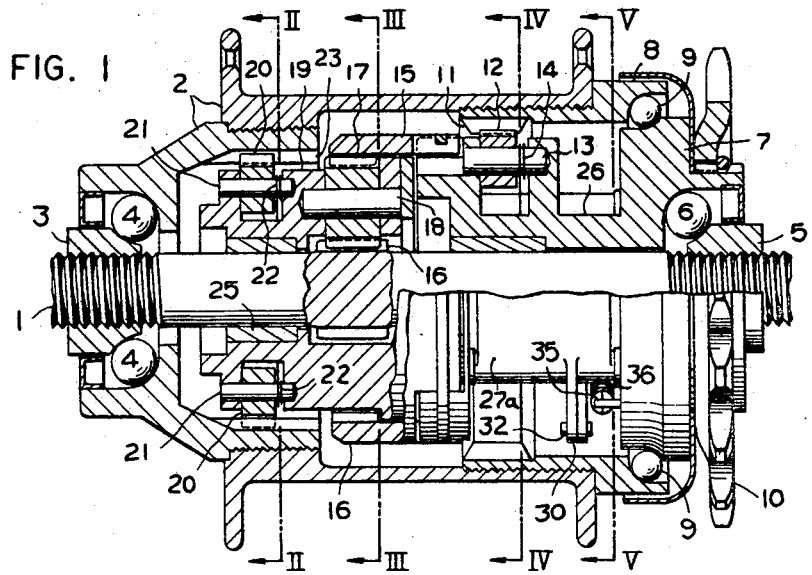
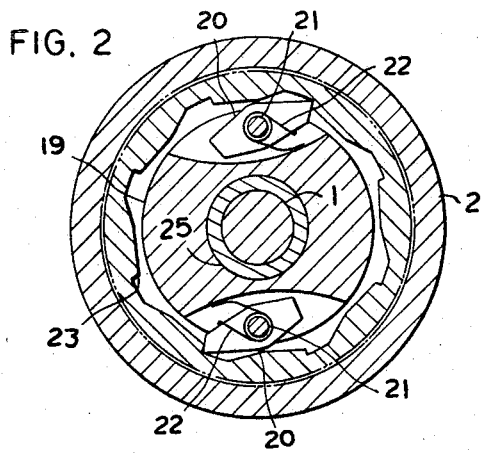
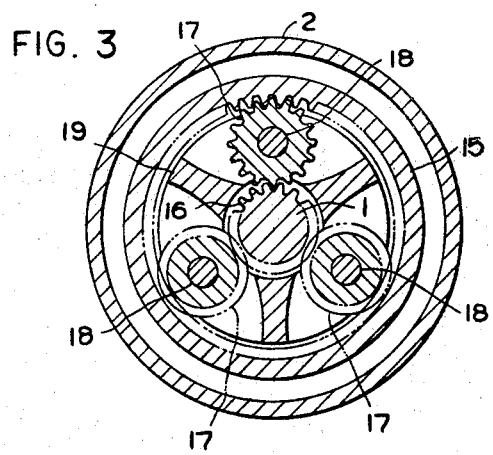
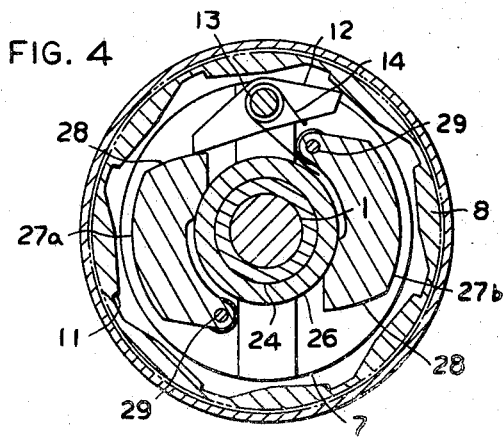
KEIZO SHIMANO AND
TAKASHI SEGAWA,
INVENTORS

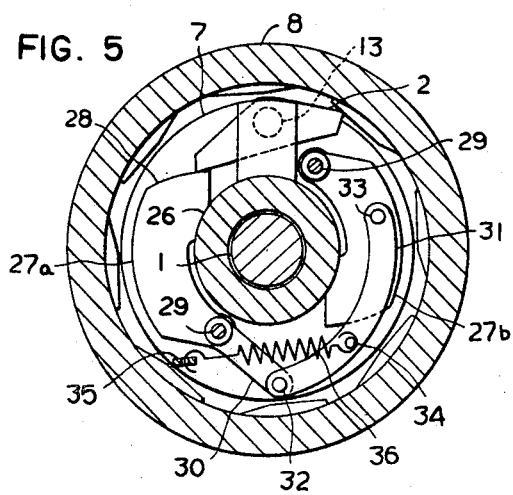
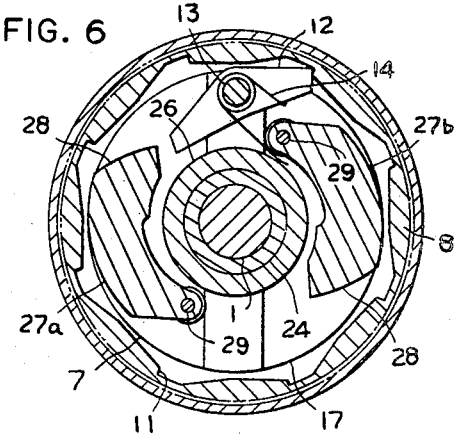
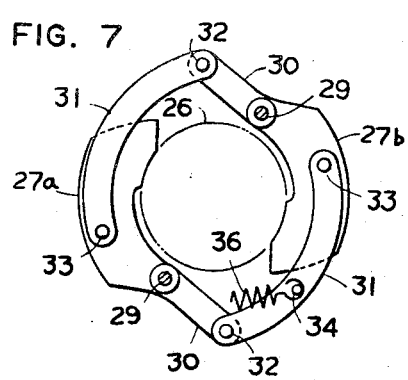
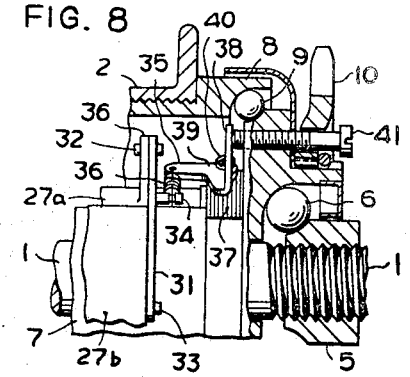
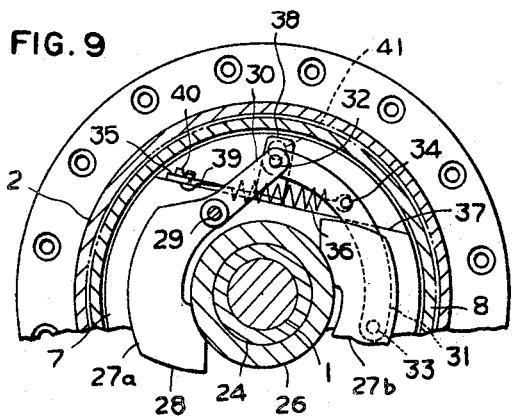
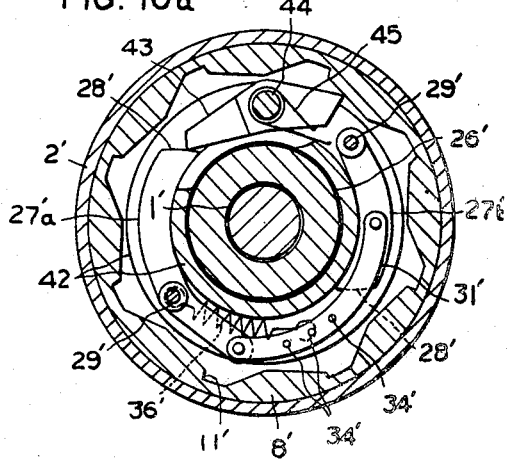

KEIZO SHIMANO AND
TAKASHI SEGAWA, INVENTORS

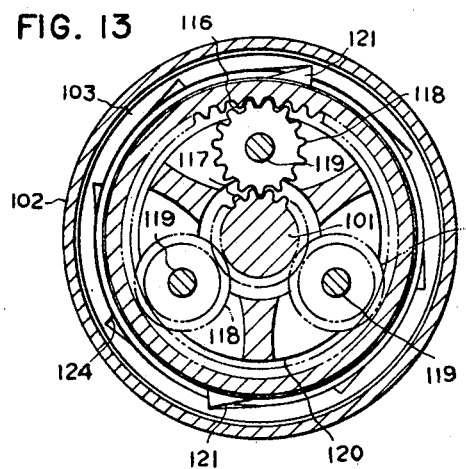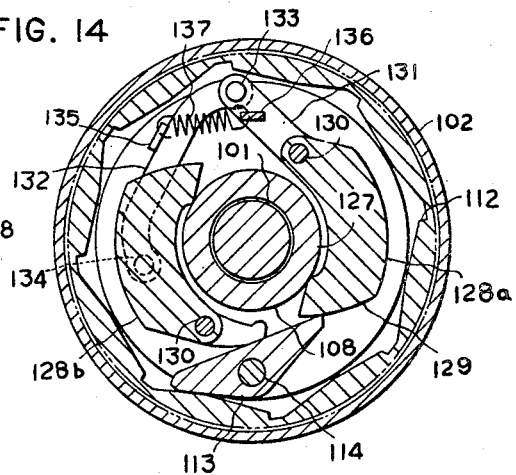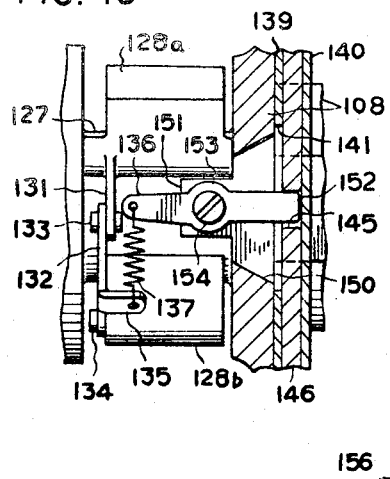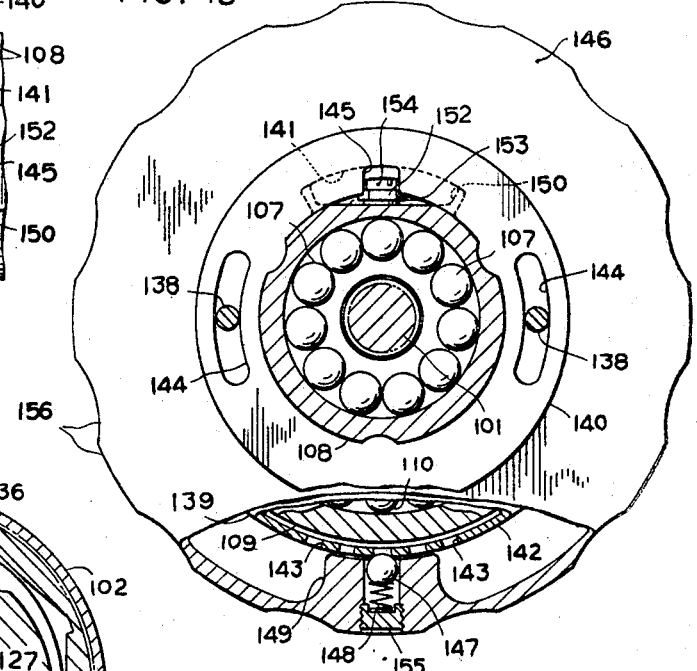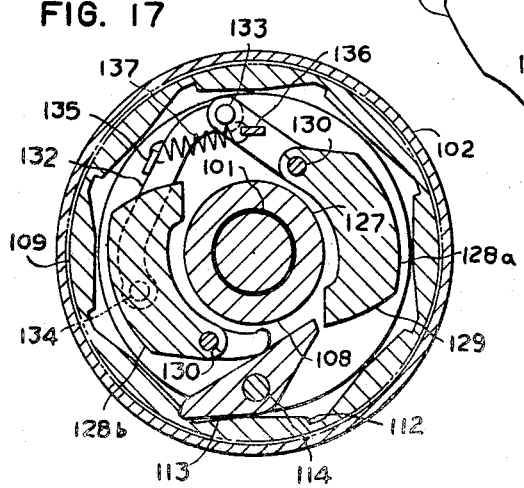

United States Patent Office 3,494,227
Patented Feb. 10, 1970

3,494,227
BICYCLE HUB HAVING A BUILT-IN TWO STAGE
SPEED CHANGE MECHANISM
Keizo Shimano and Takashi Segawa, Sakai, Japan, assignors to Shimano Kogyo Kabushiki Kaisha, Sakai, Japan
Filed June 6, 1968, Ser. No. 735,129
Claims priority, application Japan, June 20, 1967, 42/39,412; July 20, 1967, 42/63,121
Int. Cl. F16h 3/74
U.S. Cl. 74—752                     2 Claims

ABSTRACT OF THE DISCLOSURE

This invention relates to a bicycle hub having a built-in two stage speed change mechanism of the type comprising the planetary gear mechanism providing two-speed ratio and provided with a speed detecting means consisting of a pair of centrifugal governor weights adapted to control the speed change-over means responsive to the driving speed.

With respect to the bicycle hub having a built-in speed change meachanism, it has been proposed a provision of a speed responsive contrifugal governor weights adapted to automatically control the speed change-over means. In the heretofore proposed mechanism of this type, however, it has been necessary to employ large size hub for the provision of the centrifugal governor weights.

The principal object of this invention is to provide an improved two stage speed change mechanism including the speed detector consisting of a pair of centrifugal governor weights, wherein the hub and the interior mechanism are made relatively compact.

Other and further objects of the invention will appear from the following description and the accompanying drawings, wherein:

FIGURE 1 is a longitudinal sectional rear view of a bicycle hub having a built-in two stage speed change mechanism according to this invention, showing various parts in the low speed ratio driving position;

FIGURES 2 to 5 are cross-sectional views taken along lines II—II, III—III, IV—IV, and V—V, respectively, of FIGURE 1;

FIGURE 6 is a cross-sectional view corresponding to FIGURE 4, but showing various parts in the normal speed ratio driving position;

FIGURE 7 is an end view showing a modified form of the connection of centrifugal governor weights;

FIGURES 8 and 9 show a longitudinal section and cross-section, respectively, of a device for adjusting the speed change-over;

FIGURES 10 and 10a show a portion of a modified form of the mechanism when in its low speed ratio driving position;

FIGURE 10a shows a cross section taken along line XI—XI of FIGURE 10;

FIGURES 12 to 15 are cross-sectional views taken along lines XII—XII, XIII—XIII, XIV—XIV, and XV—XV, respectively, of FIGURE 11;

FIGURE 16 is a plan view, partly in section, of a device for carrying the point of change-over the driving speed-ratio; and FIGURE 17 is a cross-sectional view corresponding to FIGURE 4, showing various parts in the high speed ratio driving position.

Figure 10:
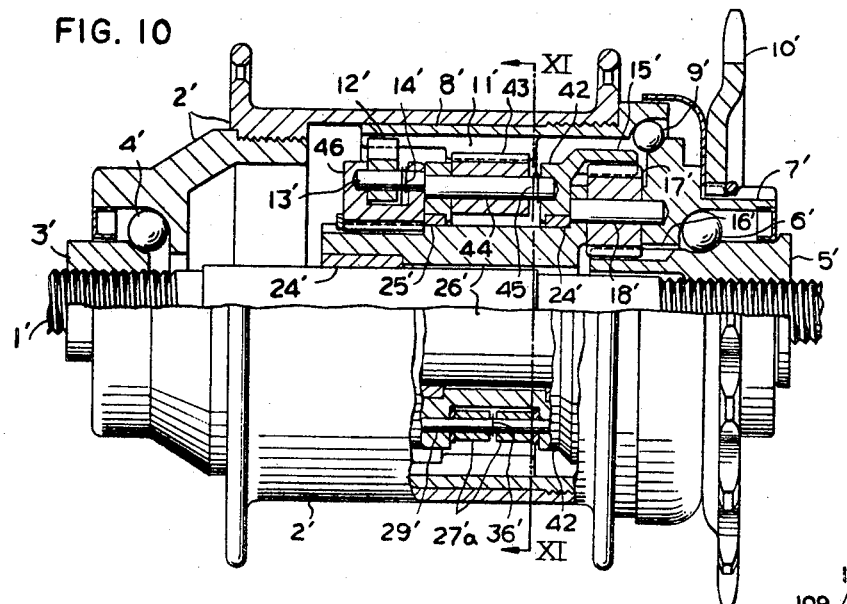

Referring to the drawing, FIGS. 1 to 8, showing the two-stage speed change mechanism, it is to be assumed that the drive of the bicycle equipped therewith is started with various parts in reduced speed ratio driving position, and that it is automatically change-over from said starting low speed to the increased normal driving speed ratio. Reference numeral 1 designates a rear fixed or dead axle of a bicycle, and 2 is a hub shell rotatably mounted thereon at the left-hand end by means of a ball bearing consisting of a ball race cone 3 and balls 4. At the right-hand end, a driving drum 7 having a driving sprocket wheel 10 is mounted on the axle 1 through a ball bearing consisting of a ball race cone 5 and balls 6. The inner portion of a mount sleeve 8 is screw thread fitted with the hub shell 2 and, at the right-hand end, it is mounted on the driving drum 7 through a ball bearing 9. The inner wall of said mount sleeve 8 is provided with an internal saw-teeth wheel 11 (FIG. 4). In the driving drum 7, there is a driving pawl 12 pivoted as at 13, which pawl 12 is adapted to engage with said saw-teeth wheel 11, being biassed by means of a spring 14. This is the normal speed ratio driving position. 15 is a splined internal gear 15, and a sun gear 16 is fixed to the axle 1. A plurality of planetary pinions 17, each being loosely mounted on an axis 18 carried by a planet carrier 19, are provided between said internal gear 15 and the sun gear 16. At the left-hand end portion of said planet carrier 19, there are low speed ratio driving pawels 20 (FIG. 2) swingably mounted as at 21, each pawl being spring biassed by means of a spring 22. Each nose of said driving pawls 20 is adapted to engage with an internal saw-teeth wheel 23 provided at the left-hand portion of the hub shell 2. If necessary, there may be provided oil immersed bearings 24 and 25 or any other bearing for the driving drum 7 and the planet carrier 19.

With the above-mentioned arrangement, at start of driving the rotation of the driving sprocket wheel 10 is transmitted through the driving drum 7, the internal gear 16, the planetary pinions 17, the planet carrier 19, the low speed ratio driving pawl 20 and the internal saw-teeth wheel 28, while the normal speed ratio driving pawl 12 is held disengaged from the internal gear 11 as shown in FIGS. 1 and 4. When the normal speed ratio driving pawl 12 is brought into engagement with the internal saw-teeth wheel 11, the driving drum 7 and the hub shell 2 are held in direct connection for the normal speed ratio drive. It will be seen that in such normal speed ratio drive condition, the low speed ratio driving pawl 20 will be rotated at the speed higher than that of the hub shell 2, so that there would not be any trouble.

An automatic device for effecting change-over of the driving speed ratio comprises two centrifugal governor weights 27a and 27b, which are arranged in the space around the reduced diameter portion 26 of the driving drum 7, said governor weights 27a and 27b being arranged in symmetric position with respect to the axis of the hub 2. Each of said centrifugal governor weights is swingably mounted as at 29. The heel 29 of one weight 27a is connected with the toe of another weight 27b by means of a link 31, a pin 32, a link 30 and a pivot at 29, and the heel 29 of other governor weight 27b is connected with the toe of the first weight 27a by means of similar link connection, as shown in FIG. 7, so that these governor weights 27a and 27b are adapted to be swung outwardly or inwardly simultaneously with respect to the axis of the hub 2. One of the links 31 has a stud 34 which is connected by means of a spring 36, other end thereof being connected to a stud 35 fixed to the driving drum 7, as shown in FIG. 5, said spring 36 having a tendency of holding the governor weights 27a and 27b in their inwardly swung position. Thus, at the start of driving or during low speed ratio driving, the governor weights 27a and 27b are pulled inwardly into contact with the wall 26 of the driving drum 7 by the action of the spring 36 against centrifugal force, thereby preventing the normal speed ratio driving pawl 12 from engagement with the internal saw-teeth wheel 11, so that the reduced speed ratio driving may be continued. Upon increase of the driving speed, the governor weights 27a and 27b will be swung outwardly against the action of the spring 36, and the tip of each of the driving pawls 12 will be brought into engagement with the saw-teeth wheel 11, thereby automatic change-over of the driving speed ratio will be effected. With respect to the connection of said governor weights 27a and 27b, it will be observed that the pivots at 29, 29 thereof and the pivots 32 and 33 of the links make a parallelogram, whereby swinging motion of both governor weights 27a and 27b is smoothly effected. Preferably, said governor weights 27a and 27b are symmetrically arranged as shown in FIG. 7.

It is most preferable that the time of automatic speed-ratio change is adjustable. For the purpose, as shown in FIGS. 8 and 9, a stepped portion 37 is provided on the driving drum 7 in the vicinity of the bearing balls 9. 39 is a bellcrank pivoted on said stepped portion 37 as at 40 and having at its one arm a stud 35 to which one end of the spring 36 is connected, and the other arm 38 left free. 41 is an adjusting screw threaded through the driving sprocket wheel 10, the inner end of the adjusting screw 41 being abutting against the free end of the arm 38 of the bellcrank 39, whereby the tension of the spring 36 may be adjusted by manipulating said adjusting screw 41.

In FIGS. 10 and 10a showing another modified form of the two-stage speed change mecanism, a sun gear 16' is mounted on an inner extension of a bearing race cone 5', and planetary pinions 17' meshing therewith are rotatably mounted on axes 18' supported by a driving drum 7'. An internal gear 15' is mounted on a planet carrier 42 which is mounted on the lefthand portion of the driving drum 7' through oil immersed bearings 24' and 25'. A high speed-ratio driving pawl 43 is swingingably mounted to said planet carrier 42, a tip of which is spring biassed by means of a spring 45 tending to bring the tip of the pawl 43 into engagement with an internal saw-teeth wheel 11'. At the lefthand portion of the driving drum 7' there is provided a normal speed ratio driving pawl 12' pivoted on a pin 13' and biassed by a spring 14' to be brought into engagement with said internal saw-teeth wheel 11'. As to the device for adjusting the speed ratio change-over, in this modification as shown in FIG. 10a, a plurality of hooks 34' for connection of one end of the spring 36' are provided in the link 31', thereby the tension of said spring 36' may be adjusted by manually changing the point of connection of the spring 36', selecting any one of said hooks 34'.

Figure 11:
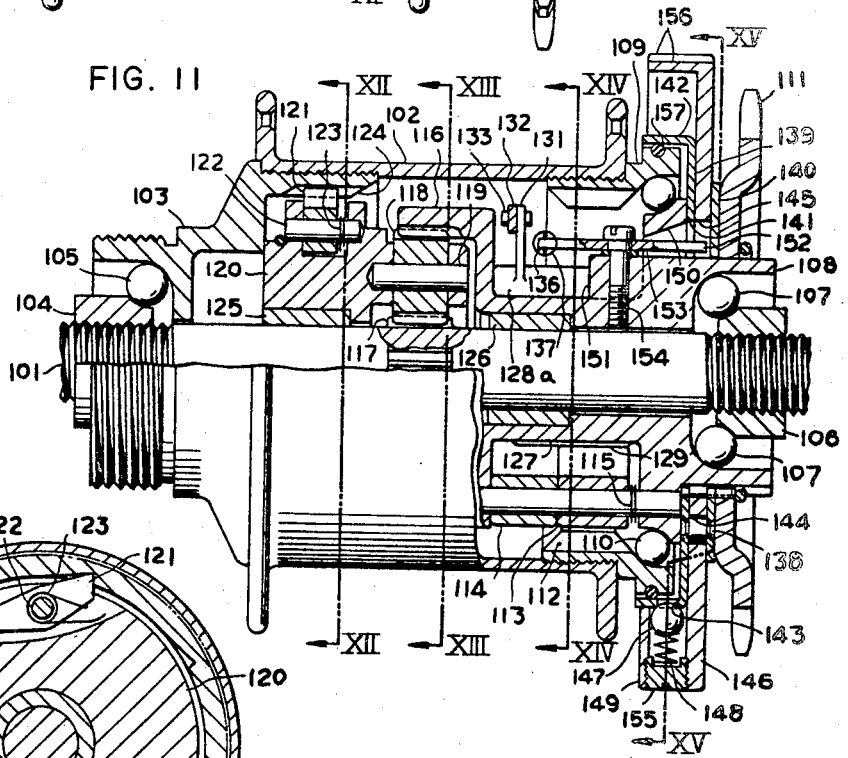
FIGURE 11 is a longitudinal sectional rear view of another modified form of a bicycle hub having a built-in two stage speed change mechanism forming another embodiment of this invention.
Figure 12:
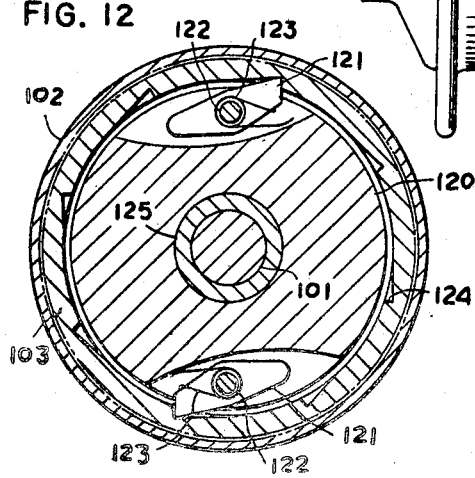

In the embodiment of this invention shown in FIGS. 11 to 17, the reference numeral 101 designates the rear dead axle of a bicycle; 102 is a hub; 103 a mounting drum; 104 is a bearing race cone at the lefthand end of the axle 101; 105 bearing balls; 106 a bearing race cone at the righthand end of the axle; 7 bearing balls; 108 is a driving drum having a driving sprocket wheel 111; 109 is a hub mounting; 110 bearing balls; 112 is an internal saw-teeth wheel thread fitted to the righthand portion of the hub 102; 113 is a normal speed driving pawl; 114 is a pivot thereof; 115 a spring; 116 is an internal gear integral with the lefthand extended end of the driving drum 108. 117 is a sun gear secured to the axle 101; 116 is an internal gear, and between which a plurality of planetary pinions 118 on pins 119 are provided as carried by a planet carrier 120. On the lefthand portion of said planet carrier 120, there is a plurality of low speed ratio driving pawls 121 pivoted on pivots 122, each pawls being spring biassed by means of springs 123, which have tendency of bringing the tips of said pawls 121 into engagement with an internal saw-teeth wheel 124. If necessary, there may be inserted oil immersed bearings 125 and 126 or other bearings between the axle 101 and the driving drum 108 and the planet carrier 120. As shown in FIGS. 11 and 14, when a normal speed ratio driving pawl 113 is held disengaged from the internal saw-teeth wheel 112, power from the sprocket wheel 111 is transmitted to the hub through the driving drum 108, the internal gear 116, the planetary pinions 118, the planet carrier 120, the low speed ratio driving pawl 121, and the internal saw-teeth wheel 124. When the normal speed ratio driving pawl 113 is brought into engagement with the internal saw-teeth wheel 112, the driving drum 108 and the hub 102 will be made rotatable in unison, so that attaining the normal speed ratio driving by means of direct power transmission from the sprocket wheel 111.

Means for automatic speed ratio change-over is constructed as follows: In the space surrounding a reduced diameter portion 127 of the driving drum 108, two centrifugal governor weights 128a and 128b are provided, the toe 129 of one governor weight 128a abutting against the tail end of the normal speed ratio driving pawl 113, and the root portion thereof having a pivot 130. The governor weights 128a and 128b are arranged symmetrically so that they are simultaneously oscillated outwardly or inwardly with respect ot the axis of the axle 101. Thus, a tail link 131 pivoted at 130 is connected to the other governor weight 128b through a pin 133, a link 132 and a pin 134. Said link 132 has a hook 135, between which hook 135 and a hook 136 on the driving drum 108 there is connected a tension spring 137 having a tendency of pulling the governor weights 128a and 128b inwardly toward the axis of the axle 101. At start of driving or during the initial driving at low speed ratio, as shown in FIGS. 11 and 14, the arcuate face 129 of one weight 128a suppresses the normal speed ratio driving pawl 113 from effective engagement with the internal saw-teeth wheel 112, while both governor weights 128a and 128b being held in inwardly pulled against the action of centrifugal force, so that desired reduced speed ratio driving may be continued. Upon increase of driving speed as shown in FIG. 17, the governor weights 128a and 128b will be automatically oscillated against the action of the spring 137, releasing the suppress of the heel of the normal speed ratio driving pawl 113, bringing the toe thereof into engagement with the internal saw-teeth wheel 112, thereby automatically changing-over of speed ratio drive condition.

In the above mentioned modification, adjustment of point of speed ratio change-over may be effected by varying the strength of the spring 137. For the purpose, the hook 136 for one end of the spring 137 is made displaceable by manipulation from outside of the mechanism. Adjacent the sprocket wheel 111, there are two guide discs 139 and 140 adapted to be adjusted of their axial distance by means of an adjusting pin 138. On the inner guide disc 139, there are an arcuate inner recess 141 and an outer flange 142 covering the righthand end of the hub mounting 109. In said flange 142, there are a plurality of holes 143. Between the guide discs 139 and 140, there is inserted an adjusting ring 146 which is rotatable for limited degree and provided with an arcuate slot 144 and a recess 145 corresponding to a recess 141 in the guide disc 139. Adjacent the adjusting ring 146 a ball 147 is provided, which is pressed inwardly by a spring 148 against one of holes 143 which are formed in the flange of the inner guide disc 139, said ball 147 being received in a box 149. In the driving drum 108, there is a recess 150 matching for the arcuate recess 141 in said guide disc 139, and the reduced diameter portion 127 in the vicinity of said recess 150 has a mounting block 151, through which a bolt 154 is screwed for mounting oscillatable bar 153 having the hook 136 at its one end. The other end of said bar 153 is formed as a motion receiver 152. This part 152 projects through the recess 150 and the recess 141 of the guide disc into the recess 145 of the adjusting ring 146. Upon rotation of the adjusting ring 146, said bar 153 is oscillated for a predetermined angle and said movement is limited by said restraining means consisting of the said clip stop hole 143 and the ball 147. The strength of the spring 148 pressing the ball 147 is made adjustable by manipulating an adjusting screw 155. For the sake of ready manipulation, the periphery of the adjusting ring 146 is preferably knurled. A seal ring 157 is preferably inserted between the hub mounting 109 and the guide disc 139.

From the foregoing it will be seen, according to the present invention, that the centrifugal governor weights for detecting driving speed of the bicycle are arranged in the internal gear of the planetary transmission mechanism, and that said speed detecting centrifugal governor weights of comparatively small size may be employed, so that it would not be necessary to employ such a large diameter hub wherein the speed change power transmission mechanism should be built-in.

What we claim is:

1. Bicycle hub having a built-in two stage speed change mechanism having a planetary gear mechanism, comprising a sun gear, planetary pinions, an internal gear meshing therewith, speed ratio changing means in said planetary gear, and a speed detecting means consisting of a pair of centrifugal governor weights oscillatably mounted to said internal gear or to a part which is rotatable in unison with said internal gear of the planetary gear mechanism and adapted to control said speed ratio change means responsive to the speed of rotation of said internal gear.

2. Bicycle hub having a built-in two stage speed change mechanism as recited in claim 1, wherein the pair of oscillatable centrifugal governor weights are connected by a spring, and provided with means for adjusting the strength of said spring, whereby the point of changeover of driving speed ratio may be varied.

References Cited

UNITED STATES PATENTS

| | | | |
|---|---|---|---|
| 3,143,005 | 8/1964 | Schwerdhofer | 74—752 |
| 3,369,429 | 2/1968 | Kimpflinger et al. | 74—752 |
| 3,388,617 | 6/1968 | Nelson | 74—752 |

ARTHUR T. McKEON, Primary Examiner